United States Patent
Ma et al.

(10) Patent No.: US 12,404,748 B2
(45) Date of Patent: Sep. 2, 2025

(54) CARBON SEQUESTRATION AND STORAGE SITE SELECTION AND USAGE

(71) Applicant: Schlumberger Technology Corporation, Sugar Land, TX (US)

(72) Inventors: Jun Tao Ma, Beijing (CN); Mengyu Han, Beijing (CN); Jing Wang, Beijing (CN); Vincenzo De Gennaro, Pau (FR); Shao Yong Su, Beijing (CN); Bingtao Li, Beijing (CN); Pei Yan, Beijing (CN); Ye Ji, Beijing (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 272 days.

(21) Appl. No.: 18/156,700

(22) Filed: Jan. 19, 2023

(65) Prior Publication Data

US 2024/0247569 A1     Jul. 25, 2024

(51) Int. Cl.
  E21B 41/00     (2006.01)

(52) U.S. Cl.
  CPC ...... E21B 41/0064 (2013.01); *E21B 2200/20* (2020.05)

(58) Field of Classification Search
  CPC .................. E21B 41/0064; E21B 2200/20
  (Continued)

(56) References Cited

U.S. PATENT DOCUMENTS 8,092,118 B2 * 1/2012 Atkin ................ C05D 3/02
                                                  47/58.1 SC
8,899,331 B2 * 12/2014 Burnham ........... E21B 41/0064
                                                  166/302

(Continued)

FOREIGN PATENT DOCUMENTS

WO       2010109340 A2     9/2010
WO    WO-2024155505 A1 *  7/2024  ......... E21B 41/0064

OTHER PUBLICATIONS

Boy Van Egmond ("Developing a method to screen and rank Geological C02 storage sites on the risk of leakage", Copernicus Institute, 2006, pp. 1-88) (Year: 2006).*

(Continued)

*Primary Examiner* — Iftekhar A Khan
(74) *Attorney, Agent, or Firm* — Jeffrey D. Frantz

(57) ABSTRACT

Techniques for carbon sequestration and storage site selection are presented. The techniques include: obtaining range estimations of criteria for potential carbon sequestration and storage sites; selecting random criteria values in respective range estimations; forming a decision matrix from the random criteria values; weighing the decision matrix to obtain representative vectors; scoring at least some the potential carbon sequestration and storage sites according to similarities of respective potential carbon sequestration and storage site representative vectors to a best vector and to a worst vector; ranking the potential carbon sequestration and storage sites according to the scores; repeating the selecting, forming, weighing, scoring, and ranking a plurality of times to obtain a plurality of sets of scores and a plurality of rankings; displaying a visualization of the plurality of rankings; and selecting a carbon sequestration and storage site from among the potential carbon sequestration and storage sites based on the visualization.

16 Claims, 8 Drawing Sheets

(58) Field of Classification Search
USPC .......................................................... 703/10
See application file for complete search history.

(56) References Cited

U.S. PATENT DOCUMENTS

| | | | | |
|---|---|---|---|---|
| 9,139,364 B1* | 9/2015 | Wang | ..................... | B65G 5/00 |
| 2002/0040177 A1* | 4/2002 | Maher | ................... | E21B 36/001 |
| | | | | 166/402 |
| 2008/0088171 A1* | 4/2008 | Cheng | ................. | E21B 41/0064 |
| | | | | 299/10 |
| 2009/0220303 A1* | 9/2009 | Dickinson, III | .... | E21B 41/0064 |
| | | | | 405/53 |
| 2009/0327186 A1* | 12/2009 | Vivalda | ................. | G06Q 10/06 |
| | | | | 706/46 |
| 2010/0299126 A1* | 11/2010 | Chugunov | ............. | G01V 11/00 |
| | | | | 703/10 |
| 2010/0318337 A1* | 12/2010 | Bailey | ................ | E21B 41/0064 |
| | | | | 703/10 |
| 2011/0066380 A1* | 3/2011 | Hager | ..................... | E21B 43/16 |
| | | | | 702/12 |
| 2016/0298447 A1* | 10/2016 | Mohaghegh | ............ | E21B 47/10 |
| 2017/0284185 A1* | 10/2017 | Hohl | ....................... | E21B 47/00 |
| 2018/0171761 A1* | 6/2018 | Schneider | ............... | E21B 43/00 |
| 2020/0024930 A1* | 1/2020 | Yang | ..................... | G01V 1/282 |
| 2022/0237891 A1* | 7/2022 | Xu | ........................ | E21B 47/002 |
| 2022/0341294 A1* | 10/2022 | Stewart | ............... | E21B 41/0064 |
| 2022/0374912 A1* | 11/2022 | Zeng | ..................... | G06Q 10/04 |
| 2023/0016334 A1* | 1/2023 | Chorn | ................... | E21B 43/305 |
| 2023/0152254 A1* | 5/2023 | Chen | ...................... | G01B 21/30 |
| | | | | 436/25 |
| 2023/0183558 A1* | 6/2023 | Hull | .................... | E21B 41/0064 |
| | | | | 166/402 |
| 2024/0058851 A1* | 2/2024 | Confair | ................... | E21B 43/20 |
| 2024/0093600 A1* | 3/2024 | Li | ....................... | E21B 41/0064 |
| 2024/0167365 A1* | 5/2024 | Groenenboom | ........ | E21B 43/26 |
| 2024/0167991 A1* | 5/2024 | Sayed | ................... | G01N 33/004 |

OTHER PUBLICATIONS

Curtis M. Oldenburg ("Screening and ranking framework (SRF) for geologic CO2 storage site selection on the basis of HSE risk", Lawrence Berkeley National Laboratory, 2006, pp. 1-16) (Year: 2006).*

Gholami et al. ("Leakage risk assessment of a CO2 storage site: A review", Earth-Science Reviews 223 (2021) pp. 1-18) (Year: 2021).*

International Search Report and Written Opinion of the PCT Application No. PCT/US224/011202 dated May 3, 2024, 8 pages.

Locatelli, G. et al., "A framework for the selection of the right nuclear power plant", International Journal of Production Research, 2023 50(17), pp. 4753-4766.

Lafleur, J. M., "Probabilistic AHP and TOPSIS for multi-attribute decision-making under uncertainty", IEEE Aerospace Conference Proceedings, 2011, pp. 1-18.

* cited by examiner

CARBON SEQUESTRATION AND STORAGE SITE SELECTION AND USAGE

BACKGROUND

Carbon sequestration and capture is a technique used to mitigate release of CO2 into the atmosphere. Any of a variety of sites may be used for carbon sequestration and storage, such as retired petroleum reservoirs, coal beds, salt domes, and saline aquifers. However, site selection involves evaluation of many factors, such as reservoir size, reservoir permeability, stability, geological containment factors, etc. To choose from among a number of potential carbon sequestration and storage sites, hundreds of criteria may be evaluated, more than can be done by a human.

SUMMARY

According to various embodiments, a method of carbon sequestration and storage site selection is presented. The method includes: obtaining range estimations of a plurality of criteria for a plurality of potential carbon sequestration and storage sites; selecting random criteria values in respective range estimations for the plurality of criteria for the plurality of potential carbon sequestration and storage sites; forming a decision matrix from the random criteria values; weighing the decision matrix according to a plurality of criteria weights, wherein a plurality of potential carbon sequestration and storage site representative vectors are obtained; scoring at least some the plurality of potential carbon sequestration and storage sites according to similarities of respective potential carbon sequestration and storage site representative vectors to a best vector and to a worst vector, wherein a set of scores for the potential carbon sequestration and storage sites are obtained; ranking the potential carbon sequestration and storage sites according to the set of scores; repeating the selecting, forming, weighing, scoring, and ranking a plurality of times, wherein a plurality of sets of scores and a plurality of rankings are obtained; displaying a visualization of the plurality of rankings; and selecting a carbon sequestration and storage site from among the plurality of potential carbon sequestration and storage sites based on the visualization.

Various optional features of the above method embodiments include the following. The method may include sequestering carbon at the carbon sequestration and storage site. The forming the decision matrix may include normalizing a matrix formed from the random criteria values. The method may include determining the plurality of criteria weights, wherein the determining the plurality of criteria weights comprises: obtaining, from at least one evaluator, a plurality of pairwise relative comparisons of the plurality of criteria; generating a weight matrix based on the plurality of relative comparisons; and determining an eigenvector for the weight matrix. The visualization may include: a plurality of image portions corresponding to at least some of the potential carbon sequestration and storage sites, wherein an image portion for a respective potential carbon sequestration and storage site comprises color codings representing the sets of scores. The visualization may include: a plurality of curves corresponding to at least some of the potential carbon sequestration and storage sites, wherein a curve for a respective potential carbon sequestration and storage site indicates a distribution of scores of the respective potential carbon sequestration and storage site in the plurality of sets of scores. The method may include displaying an ordering of at least some of the potential carbon sequestration and storage sites according to a specified percentile of their respective distribution of scores in the plurality of sets of scores. The visualization may include: a plurality of curves corresponding to at least some of the potential carbon sequestration and storage sites on a graph comprising an x-axis and a y-axis, wherein the x-axis represents a probability of ranking within an N highest ranked potential carbon sequestration and storage sites according to the plurality of rankings, and wherein the y-axis represents N. The method may include: choosing a subset of the plurality of potential carbon sequestrating sites based on the visualization; repeating the selecting, forming, weighing, and ranking a plurality of times for the subset, wherein a second plurality of rankings are obtained; and displaying a second visualization of the second plurality of rankings, wherein the carbon sequestration and storage site is further selected from among the subset of potential carbon sequestration and storage sites based on the second visualization. The forming the decision matrix from the random criteria values may include applying at least one rule to at least one of the random criteria values to obtain a factor value for at least one criteria.

According to various embodiments, a system for carbon sequestration and storage site selection is presented. The system includes an electronic processor and persistent storage storing instructions which, when executed by the electronic processor, configure the electronic processor to perform actions comprising: obtaining range estimations of a plurality of criteria for a plurality of potential carbon sequestration and storage sites; selecting random criteria values in respective range estimations for the plurality of criteria for the plurality of potential carbon sequestration and storage sites; forming a decision matrix from the random criteria values; weighing the decision matrix according to a plurality of criteria weights, wherein a plurality of potential carbon sequestration and storage site representative vectors are obtained; scoring at least some the plurality of potential carbon sequestration and storage sites according to similarities of respective potential carbon sequestration and storage site representative vectors to a best vector and to a worst vector, wherein a set of scores for the potential carbon sequestration and storage sites are obtained; ranking the potential carbon sequestration and storage sites according to the set of scores; repeating the selecting, forming, weighing, scoring, and ranking a plurality of times, wherein a plurality of sets of scores and a plurality of rankings are obtained; displaying a visualization of the plurality of rankings; and selecting a carbon sequestration and storage site from among the plurality of potential carbon sequestration and storage sites based on the visualization.

Various optional features of the above system embodiments include the following. The system may include sequestered carbon at the carbon sequestration and storage site. the forming the decision matrix may include normalizing a matrix formed from the random criteria values. The actions may further include determining the plurality of criteria weights, wherein the determining the plurality of criteria weights comprises: obtaining, from at least one evaluator, a plurality of pairwise relative comparisons of the plurality of criteria; generating a weight matrix based on the plurality of relative comparisons; and determining an eigenvector for the weight matrix. The visualization may include: a plurality of image portions corresponding to at least some of the potential carbon sequestration and storage sites, wherein an image portion for a respective potential carbon sequestration and storage site comprises color codings representing the sets of scores. The visualization may include: a plurality of curves corresponding to at least some of the potential carbon sequestration and storage sites, wherein a curve for a respective potential carbon sequestration and storage site indicates a distribution of scores of the respective potential carbon sequestration and storage site in the plurality of sets of scores. The actions may further include displaying an ordering of at least some of the potential carbon sequestration and storage sites according to a specified percentile of their respective distribution of scores in the plurality of sets of scores. The visualization may include: a plurality of curves corresponding to at least some of the potential carbon sequestration and storage sites on a graph comprising an x-axis and a y-axis, wherein the x-axis represents a probability of ranking within an N highest ranked potential carbon sequestration and storage sites according to the plurality of rankings, and wherein the y-axis represents N. The actions may further include: choosing a subset of the plurality of potential carbon sequestrating sites based on the visualization; repeating the selecting, forming, weighing, and ranking a plurality of times for the subset, wherein a second plurality of rankings are obtained; and displaying a second visualization of the second plurality of rankings, wherein the carbon sequestration and storage site is further selected from among the subset of potential carbon sequestration and storage sites based on the second visualization. The forming the decision matrix from the random criteria values may include applying at least one rule to at least one of the random criteria values to obtain a factor value for at least one criteria.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Various embodiments may be used to evaluate potential carbon sequestration and storage sites, select one or more sites, and sequester and store carbon at the selected site(s). Various embodiments are capable of evaluating potential carbon sequestration and storage sites based on hundreds of criteria and objectively identify suitable sites. Therefore, various embodiments do not merely automate a manual process, but provide techniques for assimilating hundreds of criteria over any number of sites and quantitatively rating the potential sites as suitable for carbon sequestration and storage. These and other features and advantages are presented below in reference to the figures.

Figure 1:
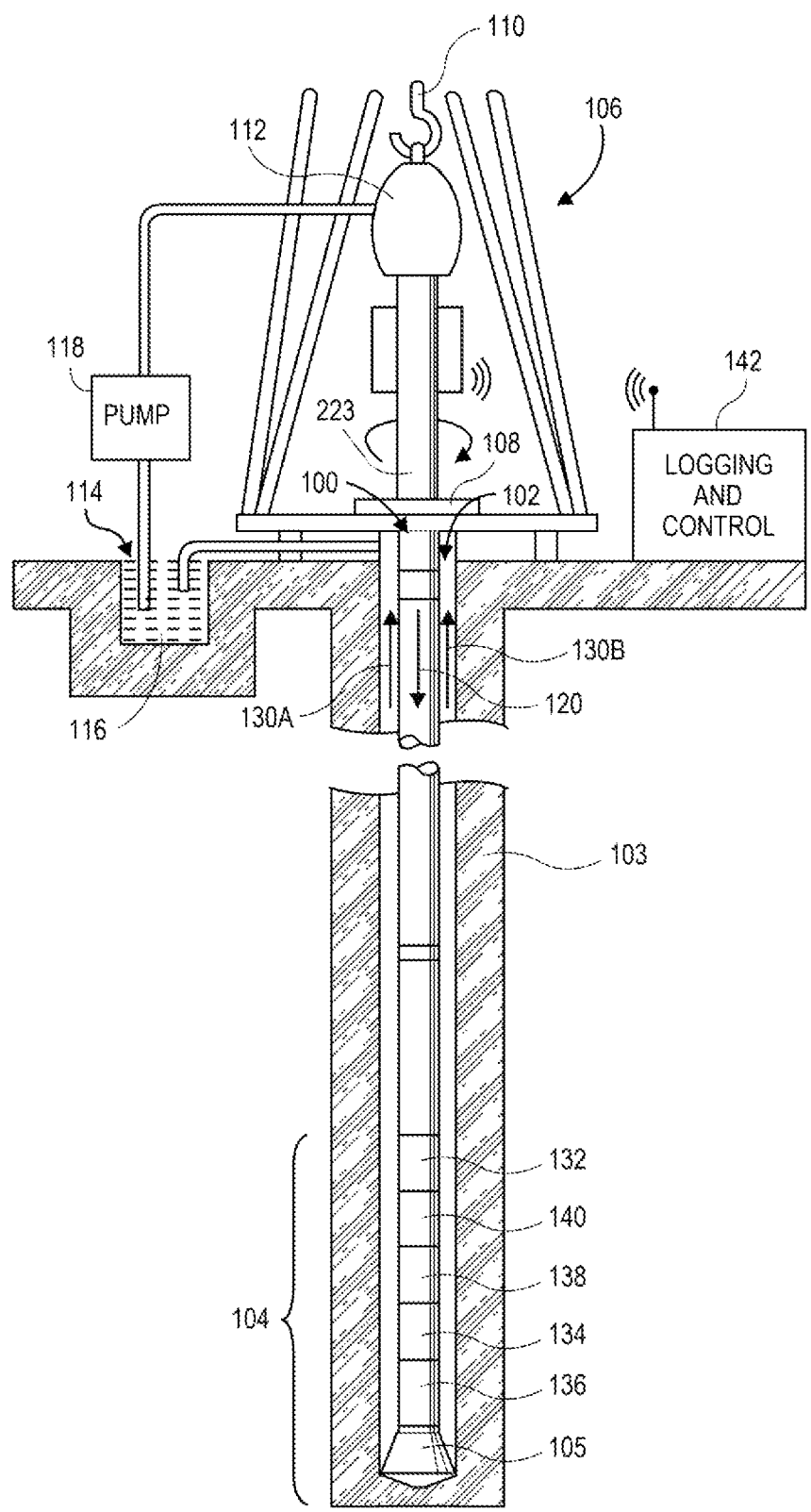
FIG. 1 illustrates an example of a wellsite system, according to various embodiments.

FIG. 1 illustrates a wellsite system according to examples of the present disclosure may be used. The wellsite can be onshore or offshore. In this example system, a drill string 100 is suspend in a borehole 102 formed in subsurface formations 103. The drill string 100 has a bottom hole assembly (BHA) 104 which includes a drill bit 105 at its lower end. A surface system 106 includes platform and derrick assembly positioned over the borehole 102, the assembly including a rotary table 108, kelly (not shown), hook 110, and rotary swivel 112. The drill string 100 is rotated by the rotary table 108 energized by a driver, which engages the kelly (not shown) at the upper end of the drill string 100. The drill string 100 is suspended from the hook 110, attached to a traveling block (also not shown), through the kelly (not shown) and the rotary swivel 112 which permits rotation of the drill string 100 relative to the hook 110. A top drive system could be used instead of the rotary table system shown in FIG. 1.

In the illustrated example, the surface system 106 further includes drilling fluid or mud 114 stored in a pit 116 formed at the well site. A pump 118 delivers the drilling fluid to the interior of the drill string 100 via a port (not shown) in the swivel 112, causing the drilling fluid to flow downwardly through the drill string 100 as indicated by the directional arrow 120. The drilling fluid exits the drill string 100 via ports (not shown) in the drill bit 105, and then circulates upwardly through an annulus region between the outside of the drill string 100 and the wall of the borehole 102, as indicated by the directional arrows 130A and 130B. In this manner, the drilling fluid lubricates the drill bit 105 and carries formation cuttings up to the surface as it is returned to the pit 116 for recirculation.

The BHA 104 of the illustrated embodiment may include a measuring-while-drilling (MWD) tool 132, a logging-while-drilling (LWD) tool 134, a rotary steerable directional drilling system 136 and motor, and the drill bit 105. It will also be understood that more than one LWD tool and/or MWD tool can be employed, e.g., as represented at 138.

The LWD tool 134 is housed in a drill collar and can contain one or a plurality of logging tools. The LWD tool 134 may include capabilities for measuring, processing, and storing information, as well as for communicating with the surface equipment. In the present example, the LWD tool 134 may include one or more tools configured to measure, without limitation, electrical resistivity, acoustic velocity or slowness, neutron porosity, gamma-gamma density, neutron activation spectroscopy, nuclear magnetic resonance and natural gamma emission spectroscopy.

The MWD tool 132 is also housed in a drill collar and can contain one or more devices for measuring characteristics of the drill string and drill bit. The MWD tool 132 further includes an apparatus 140 for generating electrical power for the downhole system. This may typically include a mud turbine generator powered by the flow of the drilling fluid, it being understood that other power and/or battery systems may be employed. The MWD tool 132 may include one or more of the following types of measuring devices, without limitation: a weight-on-bit measuring device, a torque measuring device, a vibration measuring device, a shock measuring device, a stick slip measuring device, a direction measuring device, and an inclination measuring device. The power generating apparatus 140 may also include a drilling fluid flow modulator for communicating measurement and/or tool condition signals to the surface for detection and interpretation by a logging and control unit 142.

The system may be used to reach a reservoir, such as a petroleum or natural gas reservoir. Once the reservoir is depleted, the reservoir may be used for carbon sequestration and storage. In particular, the borehole 102 may be used to pass $CO_2$ through the subsurface formation 103 to the depleted reservoir. Properties of the reservoir and surrounding geological environment may be evaluated for carbon sequestration and storage according to various embodiments.

However, embodiments are not limited to evaluating depleted reservoirs as carbon sequestration and storage sites. More generally, embodiments may evaluate any potential carbon sequestration and storage site, including, by way of non-limiting examples, coal beds, salt domes, and saline aquifers.

Figure 2:
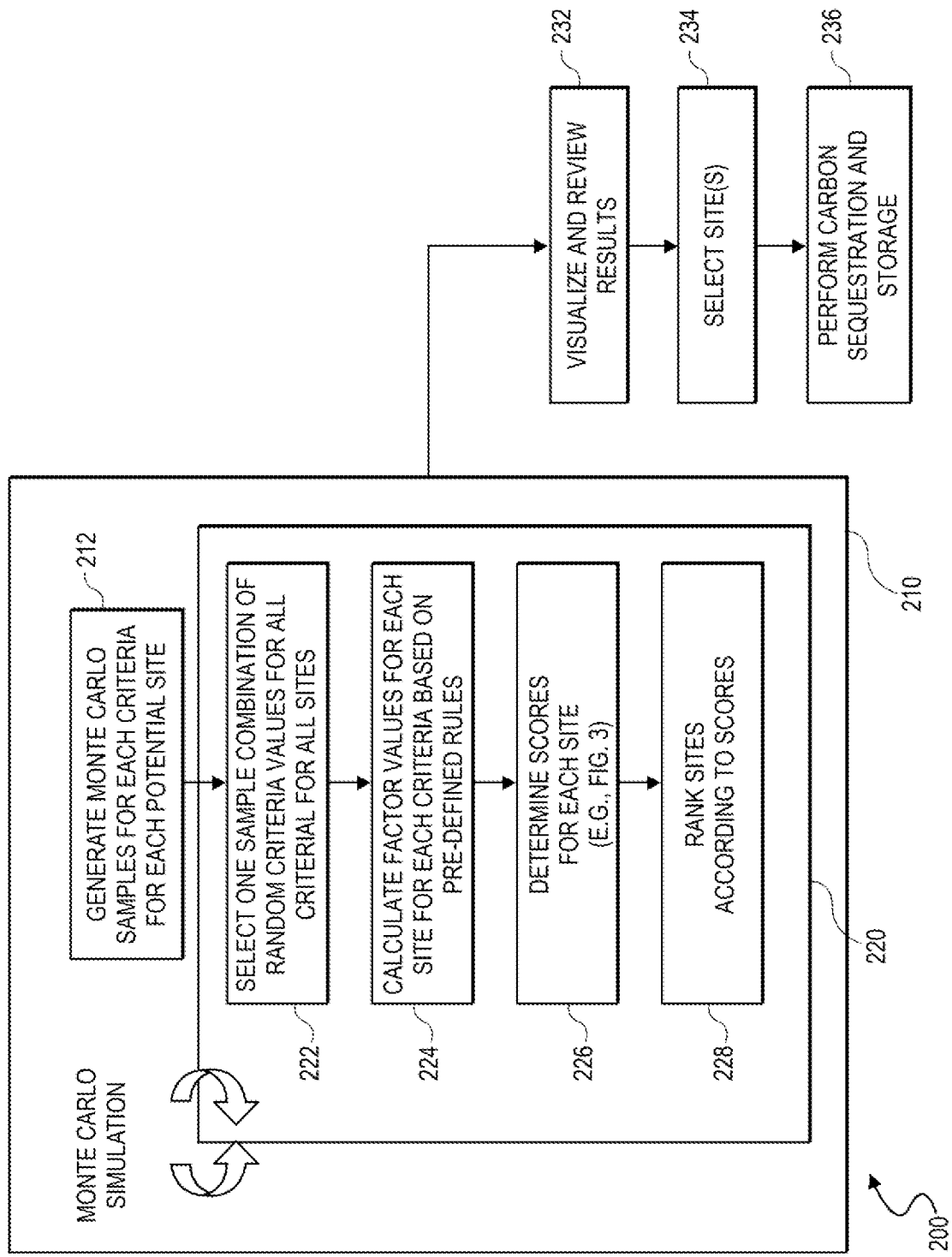
FIG. 2 is a flow diagram for a method of carbon sequestration and storage site selection according to various embodiments.

FIG. 2 is a flow diagram for a method 200 of carbon sequestration and storage site selection according to various embodiments. The method may be used to generate one or more visualizations of automated, objective rankings of the potential carbon sequestration and storage sites. According to some embodiments, many, e.g., tens, hundreds, thousands, or more, objective rankings may be visualized according to method 200. The method 200 may be implemented using the computing system 800 as shown and described herein in reference to FIG. 8, for example.

The method 200 may utilize multiple, e.g., tens, hundreds, thousands, or more, objective criteria, by which a plurality of potential carbon sequestration and storage sites are ranked. Such criteria may include any, or any combination of the following criteria: capacity criteria (e.g., reservoir extent area, reservoir gross thickness, etc.), injectivity criteria, containment criteria (e.g., containment performance of a natural fracture, reservoir depth), impact of loss of containment criteria (e.g., impact on health and safety, impact on the environment), cost factors (e.g., injection phase cost, monitoring cost), and/or legal and public factors (e.g., law and regulation favorability, ownership rights favorability).

In general, the method 200 includes a Monte Carlo simulation 210, in which many, e.g., hundreds, thousands, or more, of Monte Carlo simulation iterations 220 are executed, each Monte Carlo simulation iteration 220 generating a ranking of potential carbon sequestration and storage sites. Each Monte Carlo simulation iteration 220 utilizes reasonable, but random, values for the criteria for each potential carbon sequestration and storage site.

Thus, at 212, the method 200 includes generating Monte Carlo samples for each criteria for each potential carbon sequestration and storage site. This action may be done all at once, or performed for each simulation, e.g., as part of each individual Monte Carlo simulation iteration 220, according to various embodiments. In general, the Monte Carlo samples may be based on range estimations for each criteria for each potential carbon sequestration and storage site. Accordingly, the method 200 may include obtaining range estimations of some or all of the criteria for the potential carbon sequestration and storage sites. The range estimations may be in the form of probability distributions according to various embodiments. In general, the range estimations may be quantitative and in the form of any combination of probability distributions (e.g., uniform distributions, normal distributions, etc.), intervals, range restrictions, etc. The range estimations may be based on measurements, detections, or other empirical determinations made at or for each particular potential carbon sequestration and storage site. A Monte Carlo sample value may be based on the range estimations by selecting a random value according to the respective range estimations. For example, for a probability distribution, an individual sample may be determined by selecting a uniformly random number and mapping it to the distribution. Some criteria may admit discrete value ranges, e.g., excellent, good, adequate, suboptimal, and unacceptable. Such discrete values ranges may be characterized using discretized probability distributions, for example.

At 222, the method 200 includes selecting a sample combination of random criteria values of all criteria for all potential carbon sequestration and storage sites. Thus, for each potential carbon sequestration and storage site, values for each criteria that conform to the range estimations for that particular site are selected. The sample combination may be selected to as not to be duplicative of a sample combination already selected in a prior Monte Carlo simulation iteration 220.

At 224, the method 200 calculates factor values for each site for each criteria based on pre-defined rules. The pre-defined rules may map the random criteria values to factor values that are used in subsequent process steps of method 200. For example, according to some embodiments, one or more random criteria values themselves may be used for the respective factor value(s). As another example, the rules may apply any, or any combination, of the following mathematical functions to one or more random criteria values: log, ln, exp, $x^{-1}$, $x^{-2}$, etc. to obtain a respective factor value. Alternately, or in addition, according to 224, the method may use one or more rules to convert discrete random criteria values to factor values. As an example, the random criteria value may be selected from a range of: excellent, good, adequate, sub-optimal, and unacceptable. According to this example, a rule may map these designations to numerical quantities, e.g., 5, 4, 3, 2, and 1, respectively, and may map the numerical quantities to factor values, e.g., using any of the mathematical functions described above or other rules.

At 226, the method 200 determines a score for each potential carbon sequestration and storage site based on the factor values calculated at 224. The actions of 226 may, for example, utilize a technique such as the method 300 as shown and described herein in reference to FIG. 3. The scores may be numerical values according to various embodiments.

At 228, the method 200 ranks the potential carbon sequestration and storage sites according to the scores determined at 226. The ranking may include ordering the sites according to their respective scores, e.g., from lowest to highest (or from highest to lowest). The ordering may be performed by associating an enumeration with the potential carbon sequestration and storage sites, e.g., in persistent electronic memory. The result of 228 is a ranking of the potential carbon sequestration and storage sites.

At 232, the method 200 visualizes the ranking produced at 228. The visualization may be displayed on a computer monitor, for example. The visualization may be a visualization such as are shown and described herein in reference to any of FIG. 5, 6, or 7, for example.

At 234, a site is selected from among the potential carbon sequestration and storage sites for carbon sequestration and storage. One or more sites may be selected.

According to some embodiments, a subset of the potential carbon sequestration and storage sites are selected at 234, and the actions of 212, 222, 224, 226, 228, and 232 are repeated using the subset as described herein in reference to the plurality of carbon sequestration and storage sites. Such repetition may result in a further refined subset, that is, a subset of the subset. This entire repetition process itself may be performed once or more than once, to yield a final subset, representing the most desirable carbon sequestration and storage sites from among the plurality of carbon sequestration and storage sites.

At 236, carbon, e.g., CO2, is sequestered and stored at the selected carbon sequestration and storage sites. This process may be performed by injecting the carbon underground into a reservoir, for example.

Figure 3:
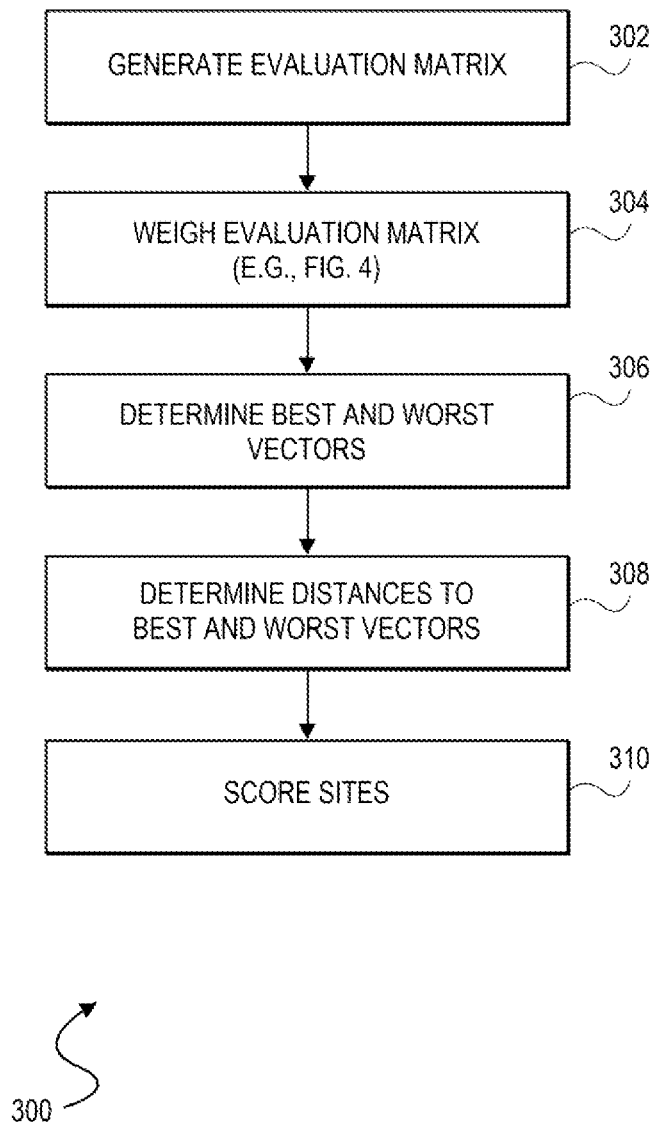
FIG. 3 is a flow diagram for a method of determining scores for potential carbon sequestration and storage sites according to various embodiments.

FIG. 3 is a flow diagram for a method 300 of determining scores for potential carbon sequestration and storage sites according to various embodiments. The method 300 may be used for 226 of method 200. The method 300 may be implemented using the computing system 800 as shown and described herein in reference to FIG. 8, for example. The method 300 may utilize a Technique of Order of Preference by Similarity to Ideal Solution (TOPSIS), by way of non-limiting example.

At 302, the method 300 generates an evaluation matrix, also referred to herein as a decision matrix. The evaluation matrix may be an m×n matrix, where m is the number of potential carbon sequestration and storage sites, and n is the number of criteria. The evaluation matrix may thus have m rows, one for each potential carbon sequestration and storage site, and n columns, one for each criteria. The cells of evaluation matrix are populated with corresponding factor values of the criteria for each potential carbon sequestration and storage site. The factor values may be obtained, for example, as shown and described in reference to 212, 222, and 224 of method 200 as shown and described herein in reference to FIG. 2. The evaluation matrix may also be normalized at 302.

At 304, the method 300 weighs the evaluation matrix to obtain a weighted evaluation matrix. This may include multiplying the factor value in each cell of the evaluation matrix by a corresponding weight to obtain weighted factor values. The weights may be determined, for example, using the method 400 as shown and described herein in reference to FIG. 4. In general, the weights indicate the relative importance of each criteria. The rows in the weighted evaluation may be representative vectors for the potential carbon sequestration and storage sites.

At 306, the method 300 determines the best vector and worst vector, corresponding to a theoretical best carbon sequestration and storage site and a worst theoretical carbon sequestration and storage site, respectively. Each of these vectors may include n components, respectively. The best vector may be formed by selecting weighted factor values for each criteria from among the weighted factor values for such criteria obtained at 304, such that the selected weighted factor value for a given criteria represents the most favored weighted factor value for such criteria. The worst vector may be formed by selecting weighted factor values for each criteria from among the weighted factor values for such criteria obtained at 304, such that the selected weighted factor value for a given criteria represents the most disfavored weighted factor value for such criteria.

At 308, the method 300 determines distances of the representative vectors for the potential carbon sequestration and storage sites to each of the best vector and the worst vector. The distances may be calculated as Euclidean distance in n-dimensional space.

At 310, the potential carbon sequestration and storage sites may be scored based on the distances determined at 308. For a given potential carbon sequestration and storage site, the score may be determined as a proximity of its representative vector to best vector and a remoteness of its representative vector to the worst vector. The score for a given potential carbon sequestration and storage site may be calculated as, by way of non-limiting example, $S=d_w/(d_w+d_b)$, where $d_w$ represents the distance of the representative vector for the carbon sequestration and storage site to the worst vector and $d_b$ represents the distance of the representative vector for the carbon sequestration and storage site to the best vector. Thus, 310 produces quantitative scores for each of the carbon sequestration and storage sites. The scores may be used at 226 in the method 200 as shown and described herein in reference to FIG. 2.

Figure 4:
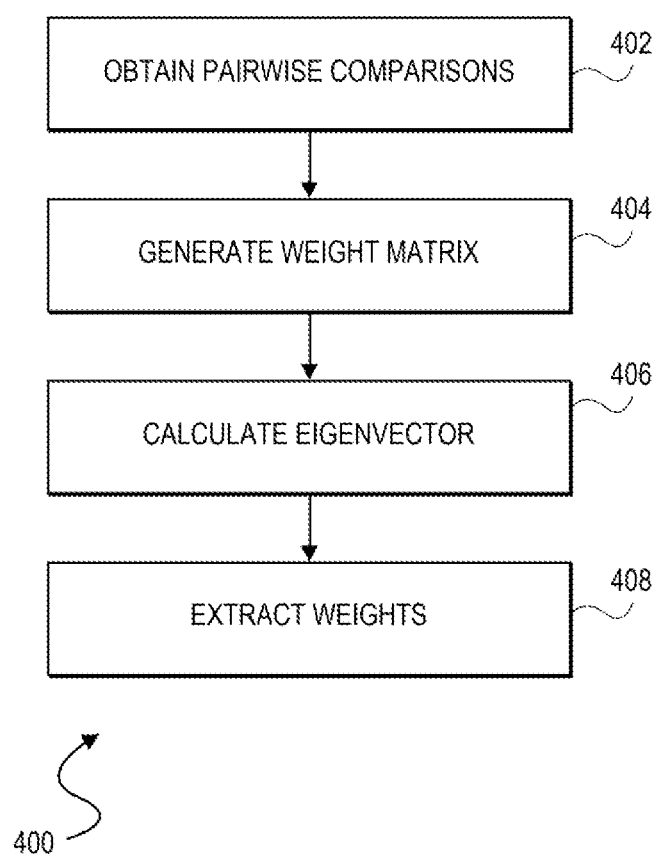
FIG. 4 is a flow diagram for a method of weighing criteria for evaluating carbon sequestration and storage sites according to various embodiments.

FIG. 4 is a flow diagram for a method 400 of weighing criteria for evaluating carbon sequestration and storage sites according to various embodiments. The method 400 may be used to obtain weights for use at 304 of the method 300, as shown and described herein in reference to FIG. 3. The method 400 may be implemented using the computing system 800 as shown and described herein in reference to FIG. 8, for example. The method 400 may utilize an Analytic Hierarchy Process (AHP), by way of non-limiting example.

At 402, the method 400 obtains pairwise comparisons of the criteria. The comparisons attribute quantitative values to each pair of criteria, indicating the relative importance of the two criteria. For example, the first criteria in a pair may be compared to the second criteria in the pair, and a number attributed to the comparison indicating how much more important the first criteria is in comparison to the second criteria. A standard scale may be used, e.g., 1, indicating that the criteria are equally important, up to 10, indicating that the first criteria is much more important than the second criteria. The comparisons may be obtained from users. Multiple users may contribute to the comparisons. According to some embodiments, averages of the comparison values provided by multiple users may be used. The comparisons may be obtained using a user interface and stored in persistent memory.

At 404, a weight matrix is generated. The weight matrix may be n×n, where n is the number of criteria. The columns and rows may represent the n criteria in order, where a cell in the matrix at (i,j) may include the weight comparing the i-th criteria to the j-th criteria. In such case, the entry in the cell (j,i) may be the reciprocal of the value in the cell (i,j). For example, if $w_{i,j}$ represents the entry in the cell (i,j), then $w_{j,i}=1/w_{i,j}$. The diagonal cells of the matrix, which indicate the comparison of a criteria to itself, may be populated with values of 1.

At 406, an eigenvector, e.g., a right principal eigenvector, of the weight matrix is calculated. Any technique may be used to calculate the eigenvector. For example, an algorithm based on the Caley-Hamilton theorem may be used. The eigenvector may include n entries.

At 408, weights may be extracted from the eigenvector after normalization. For example, the eigenvector may be normalized so that its n entries sum to one, and then the entries may be used as weights, ordered using the same enumeration of criteria as was used to order the criteria in 406. The weights may be stored in persistent memory, and used at 304 in the method 300 as shown and described herein in reference to FIG. 3.

According to some embodiments, e.g., that utilize methods 200, 300, and 400 far fewer comparisons are utilized to rank potential carbon sequestration and storage sites in comparison to techniques that require pairwise comparisons of every pair of potential carbon sequestration and storage site for every criterion. Some such embodiments may reduce by 75% or more a number of user comparison inputs.

Figure 5:
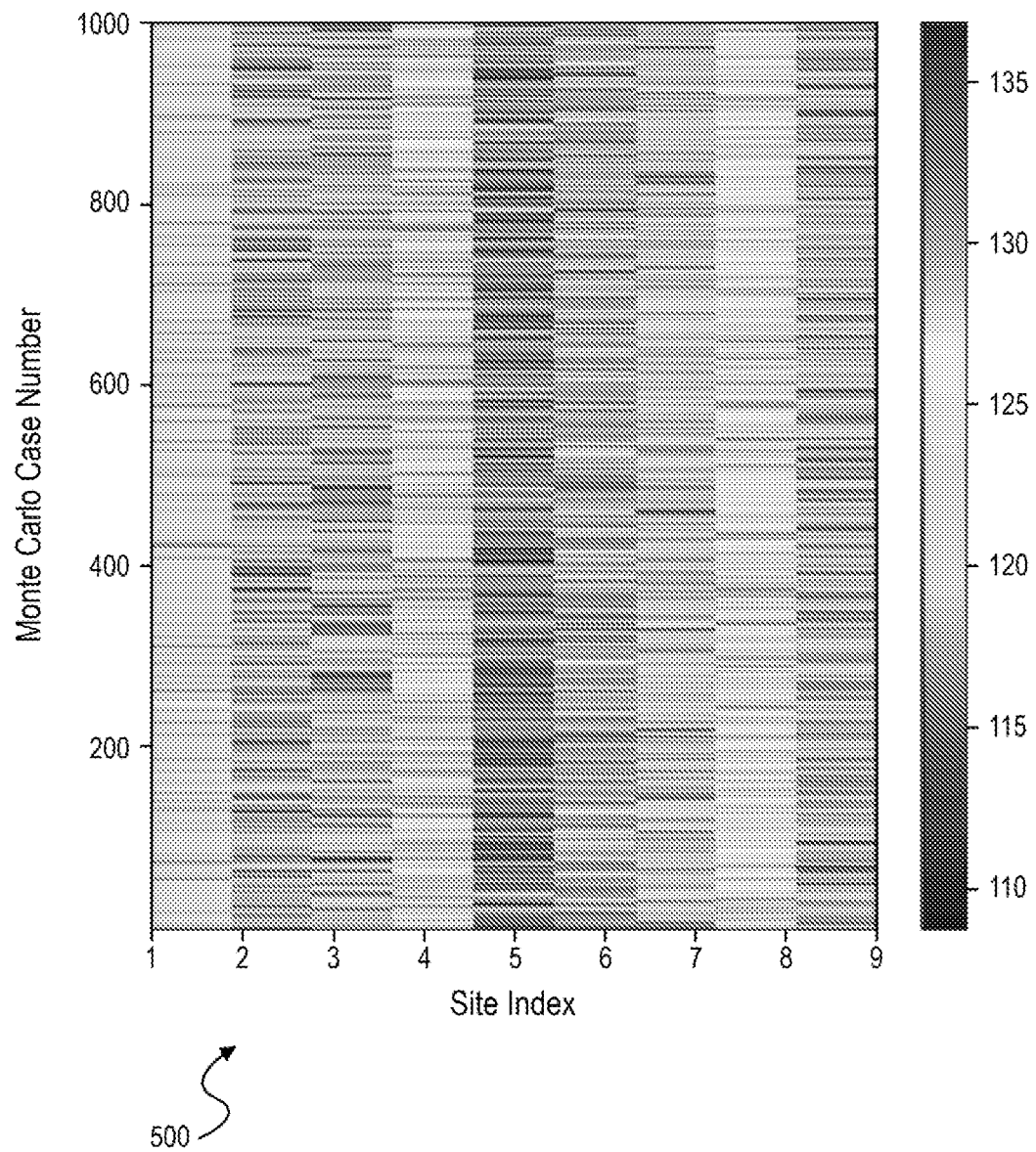
FIG. 5 is a visualization of ranked potential carbon sequestration and storage sites that displays color coded scores according to various embodiments.

FIG. 5 is a visualization 500 of ranked potential carbon sequestration and storage sites that displays color coded scores according to various embodiments. The visualization 500 may be displayed on a computer monitor, for example. The visualization 500 is for nine potential carbon sequestration and storage sites, by way of non-limiting example, represented along the x-axis. The y-axis represents individual Monte Carlo iterations, e.g., as produced by the iterations 220 of the Monte Carlo simulation 210 as shown and described herein in reference to FIG. 2.

In this potential carbon sequestration and storage site selection example, each of the nine potential carbon sequestration and storage sites was evaluated according to 1,000 different possible input combinations. Thus, the visualization 500 displays 9,000 scores on the shade axis, with the top of the axis representing high scores and the bottom of the axis representing low score. Note that embodiments may utilize shades or colors to represent scores. As shown in FIG. 5, shades appear in distinct vertical stripes. For example, the sixth potential carbon sequestration and storage site has the most distinct stripes shaded near the top of the shade axis, while the fifth potential carbon sequestration and storage site has the most distinct stripes shaded near the bottom of the shade axis. Thus, the visualization 500 provides a visual summary of which potential carbon sequestration and storage sites are likely to emerge as top candidates.

Accordingly, the visualization 500 shows a plurality of image portions (the vertical stripes), each corresponding to a different potential carbon sequestration and storage site. Each image portion includes shade or color codings representing scores of the respective potential carbon sequestration and storage site among the iterations of the Monte Carlo simulation.

In addition, the visualization 500 provides some information on the variability of the scores for particular potential carbon sequestration and storage sites. For example, the first potential carbon sequestration and storage site has a more consistent shade across all Monte Carlo simulation iterations than the last potential carbon sequestration and storage site, suggesting that the score for the first site is relatively insensitive to the input uncertainty.

Figure 6:
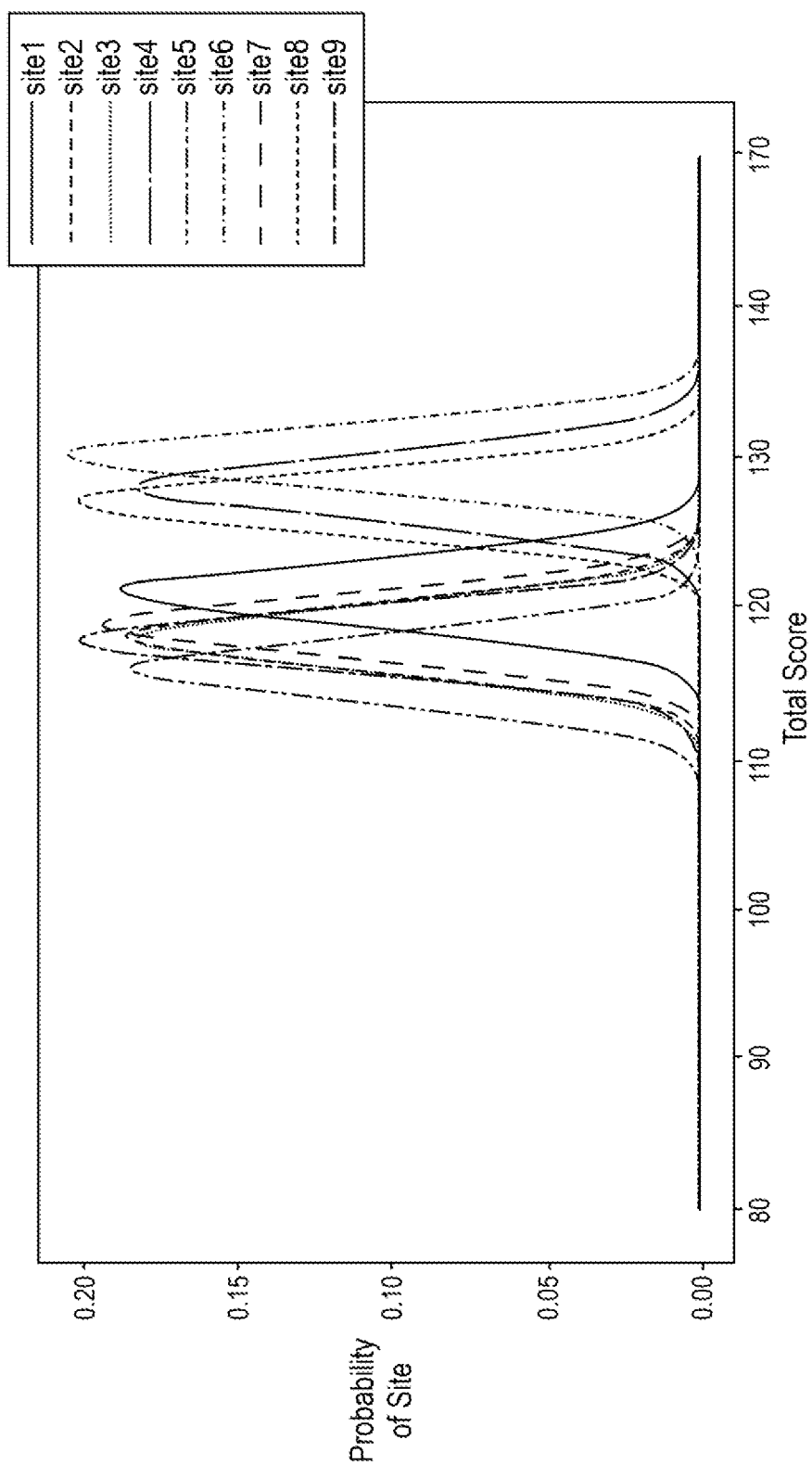
FIG. 6 is a visualization of ranked potential carbon sequestration and storage sites that displays distributions of scores according to various embodiments.

FIG. 6 is a visualization 600 of ranked potential carbon sequestration and storage sites that displays distributions of scores according to various embodiments. The visualization 600 may be displayed on a computer monitor, for example. The visualization 600 corresponds to distributions of scores of the potential carbon sequestration and storage sites. More particularly, the Monte Carlo simulation (e.g., 210 of method 200) may produce a plurality of sets of scores of the potential carbon sequestration and storage sites, one set of scores for each iteration (e.g., 220 of method 200). For a given carbon sequestration and storage site, its scores from among the plurality of sets of scores may be obtained. These scores for the given carbon sequestration and storage site from among the Monte Carlo iterations may form a distribution of scores, e.g., a normal distribution of scores. The distribution may be represented as a curve. The visualization 600 of FIG. 6 depicts such curves for a plurality of carbon sequestration and storage sites.

In sum, the visualization 600 shows a plurality of curves corresponding to a plurality of potential carbon sequestration and storage sites. A curve for a given potential carbon sequestration and storage site indicates a distribution of scores of the potential carbon sequestration and storage site from among iterations of the Monte Carlo simulation.

Related to the visualization 600 of FIG. 6, the potential carbon sequestration and storage sites may be ranked based on specified percentiles of their score distributions. Example specified percentiles include the $10^{th}$ percentile, the $50^{th}$ percentile, and the $90^{th}$ percentile. In more detail, a specified percentile value of each of the distributions of scores, e.g., as depicted in the visualization 600 of FIG. 6, may be determined, such that each potential carbon sequestration and storage site is associated with a value at the specified percentile. The potential carbon sequestration and storage sites may be ordered according to such values. The ordering of the potential carbon sequestration and storage sites according to the specified percentile of their respective distribution of scores in the plurality of sets of scores may be displayed. The Table below depicts three example of such orderings, for the $10^{th}$ percentile, the $50^{th}$ percentile, and the 90th percentile, for the nine potential carbon sequestration and storage sites discussed herein in reference to FIG. 6.

TABLE

| 10th Percentile | 50th Percentile | 90th Percentile |
|---|---|---|
| Site 6 | Site 6 | Site 6 |
| Site 4 | Site 4 | Site 4 |
| Site 8 | Site 8 | Site 8 |
| Site 1 | Site 1 | Site 1 |
| Site 7 | Site 7 | Site 7 |
| Site 9 | Site 3 | Site 2 |
| Site 2 | Site 2 | Site 3 |
| Site 3 | Site 9 | Site 9 |
| Site 5 | Site 5 | Site 5 |

Figure 7:
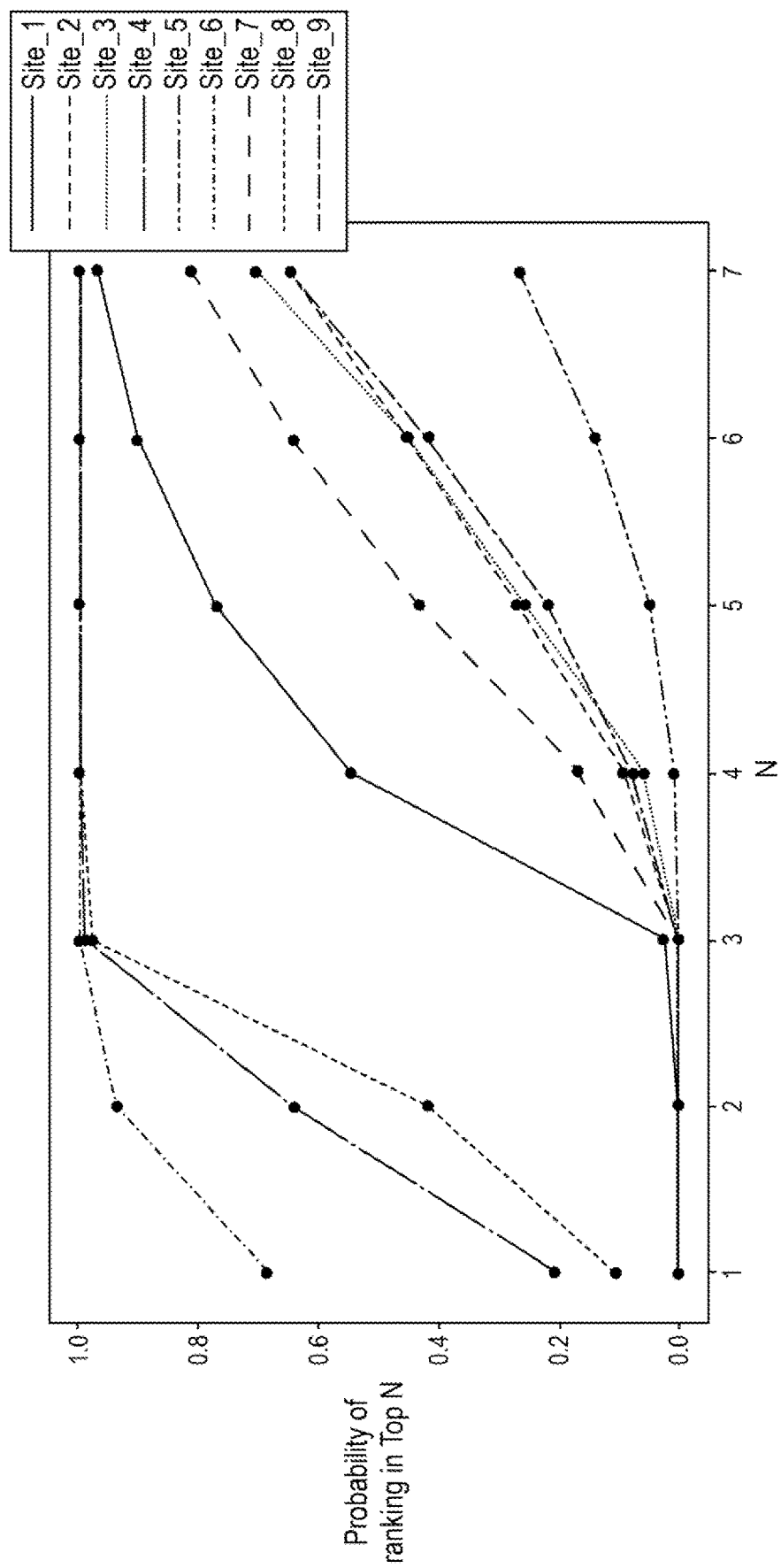
FIG. 7 is a visualization of ranked potential carbon sequestration and storage sites that displays probability of being ranked within the N highest rankings according to various embodiments.

FIG. 7 is a visualization 700 of ranked potential carbon sequestration and storage sites that displays probability of being ranked within the N highest rankings according to various embodiments. The visualization 700 may be displayed on a computer monitor, for example. In the visualization 700, each potential carbon sequestration and storage site is indicated by a particular curve, and the y-axis indicates the probability that a particular potential carbon sequestration and storage site ranks within the top N sites among the plurality of Monte Carlo simulation iterations. The x-axis indicates the value of N.

Thus, for example, Site 6 has about a 67% probability of being the best design (N=1) and a nearly 100% probability of falling within the top three, four, five, etc. ranked potential carbon sequestration and storage sites. Site 8 has less than 10% probability of being the best site, but has almost 100% probability of falling within the top three, four, five, etc. ranked potential carbon sequestration and storage sites.

Another characteristic that the visualization 700 shows is the presence of so-called "probability reversal" scenarios. For example, Site 3 falls within the top four sites 6% of the time, and Site 9 does so 8% of the time. However, Site 3 falls within the top five 26% of the time, while Site 9 does so only 22% of the time. This "probability reversal" occurs whenever two lines in the visualization 700 cross. In such a scenario, the suitability of one site will depend on the selected value of N. Thus, if a decision maker is uncertain of which N to examine (e.g., if there are margins in how many sites to select for further study), sensitivity data such as in the visualization 700 can be informative.

Figure 8:
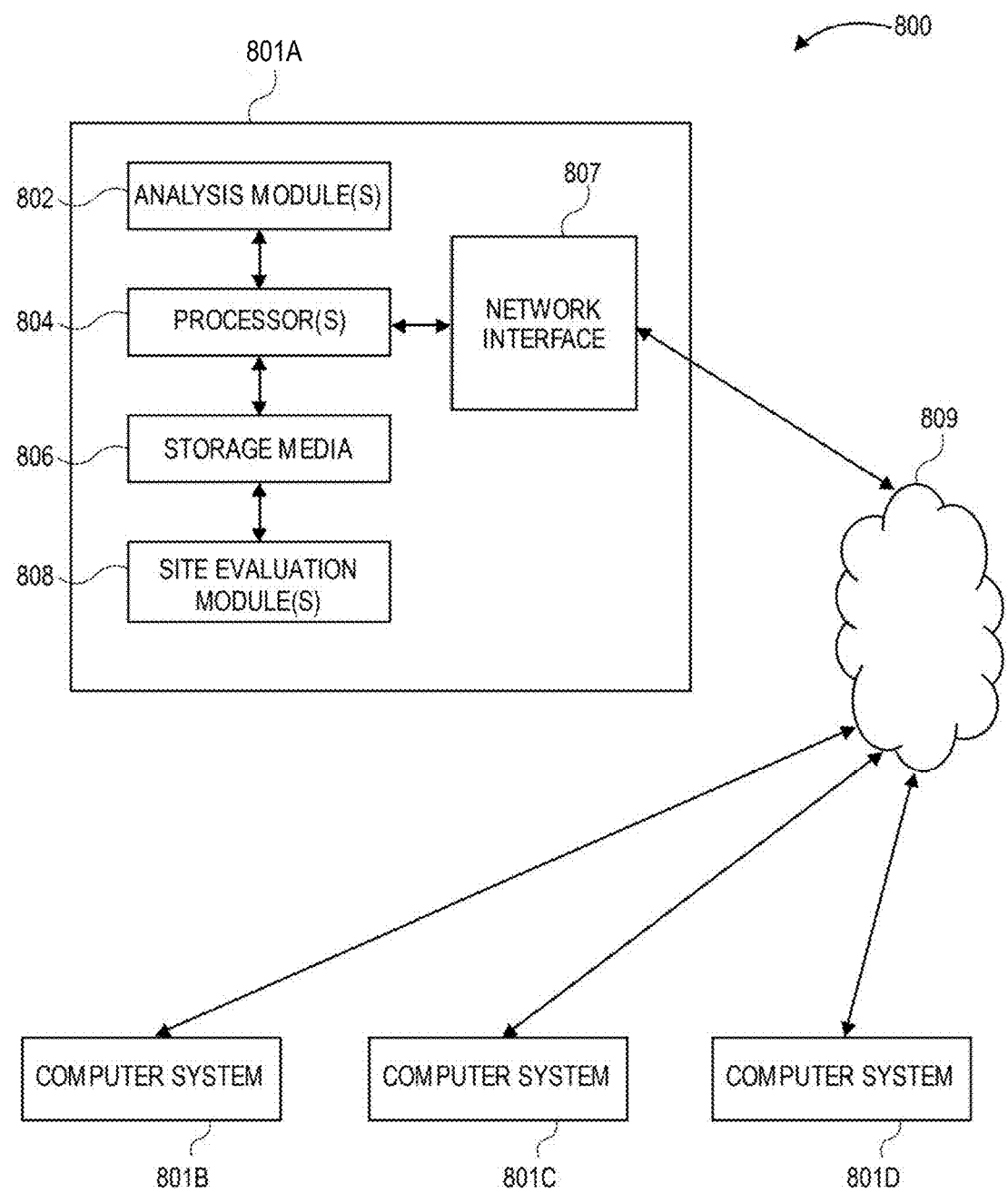
FIG. 8 illustrates an example computing system suitable for executing the methods of the present disclosure, according to various embodiments.

FIG. 8 illustrates an example computing system 800 suitable for executing the methods of the present disclosure, according to various embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 800 contains one or more site evaluation module(s) 808. The site evaluation module 808 may perform one or more of the methods 200, 300, and/or 400, as shown and described herein in reference to FIGS. 2, 3, and 4, respectively. In the example of computing system 800, computer system 801A includes the site evaluation module 808. In some embodiments, one of the site evaluation module(s) 808 may be used to perform some or all aspects of one or more embodiments of the methods disclosed herein. In alternate embodiments, a plurality of site evaluation modules, such as site evaluation module 808 may be used to perform some or all aspects of methods herein.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method of carbon sequestration and storage site selection, the method comprising:
    obtaining range estimations of a plurality of criteria for a plurality of potential carbon sequestration and storage sites;
    selecting random criteria values in respective range estimations for the plurality of criteria for the plurality of potential carbon sequestration and storage sites;
    forming a decision matrix from the random criteria values;
    determining a plurality of criteria weights, wherein the determining the plurality of criteria weights comprises:
        obtaining, from at least one evaluator, a plurality of pairwise relative comparisons of the plurality of criteria;
        generating a weight matrix based on the plurality of pairwise relative comparisons; and
        determining an eigenvector for the weight matrix;
    weighing the decision matrix according to the plurality of criteria weights, wherein a plurality of potential carbon sequestration and storage site representative vectors are obtained;
    scoring at least some the plurality of potential carbon sequestration and storage sites according to similarities of respective potential carbon sequestration and storage site representative vectors, of the plurality of potential carbon sequestration and storage site representative vectors, to a best vector and to a worst vector, wherein a set of scores for the potential carbon sequestration and storage sites are obtained;
    ranking the potential carbon sequestration and storage sites according to the set of scores;
    repeating the selecting, forming, weighing, scoring, and ranking a plurality of times, wherein a plurality of sets of scores and a plurality of rankings are obtained;
    displaying a visualization of the plurality of rankings;
    selecting a carbon sequestration and storage site from among the plurality of potential carbon sequestration and storage sites based on the visualization; and
    sequestering and storing carbon at the carbon sequestration and storage site based on the selection.

2. The method of claim 1, wherein the forming the decision matrix comprises normalizing a matrix formed from the random criteria values.

3. The method of claim 1, wherein the visualization comprises a plurality of image portions corresponding to at least some of the potential carbon sequestration and storage sites, and wherein an image portion for a respective potential carbon sequestration and storage site comprises color codings representing the sets of scores.

4. The method of claim 1, wherein the visualization comprises a plurality of curves corresponding to at least some of the potential carbon sequestration and storage sites, and wherein a curve, of the plurality of curves, for a respective potential carbon sequestration and storage site, of the at least some of the potential carbon sequestration and storage sites, indicates a distribution of scores of the respective potential carbon sequestration and storage site in the plurality of sets of scores.

5. The method of claim 1, wherein the visualization comprises an ordering of at least some of the potential carbon sequestration and storage sites according to a specified percentile of their respective distribution of scores in the plurality of sets of scores.

6. The method of claim 1, wherein the visualization comprises a plurality of curves corresponding to at least some of the potential carbon sequestration and storage sites on a graph comprising an x-axis and a y-axis, wherein the x-axis represents a probability of ranking within an N highest ranked potential carbon sequestration and storage sites according to the plurality of rankings, and wherein the y-axis represents N.

7. The method of claim 1, further comprising:
    choosing a subset of the plurality of potential carbon sequestrating sites based on the visualization;
    repeating the selecting, forming, weighing, and ranking a plurality of times for the subset, wherein a second plurality of rankings are obtained; and
    displaying a second visualization of the second plurality of rankings, wherein the carbon sequestration and storage site is further selected from among the subset of potential carbon sequestration and storage sites based on the second visualization.

8. The method of claim 1, wherein the forming the decision matrix from the random criteria values comprises applying at least one rule to at least one of the random criteria values to obtain a factor value for at least one criteria.

9. A system for carbon sequestration and storage site selection, the system comprising:
    an electronic processor; and
    persistent storage storing instructions which, when executed by the electronic processor, configure the electronic processor to perform actions comprising:
        obtaining range estimations of a plurality of criteria for a plurality of potential carbon sequestration and storage sites;
        selecting random criteria values in respective range estimations for the plurality of criteria for the plurality of potential carbon sequestration and storage sites;
        forming a decision matrix from the random criteria values;
        determining a plurality of criteria weights, wherein the determining the plurality of criteria weights comprises:
            obtaining, from at least one evaluator, a plurality of pairwise relative comparisons of the plurality of criteria;

generating a weight matrix based on the plurality of pairwise relative comparisons; and determining an eigenvector for the weight matrix;

weighing the decision matrix according to the plurality of criteria weights, wherein a plurality of potential carbon sequestration and storage site representative vectors are obtained;

scoring at least some the plurality of potential carbon sequestration and storage sites according to similarities of respective potential carbon sequestration and storage site representative vectors, of the plurality of potential carbon sequestration and storage site representative vectors, to a best vector and to a worst vector, wherein a set of scores for the potential carbon sequestration and storage sites are obtained;

ranking the potential carbon sequestration and storage sites according to the set of scores;

repeating the selecting, forming, weighing, scoring, and ranking a plurality of times, wherein a plurality of sets of scores and a plurality of rankings are obtained;

displaying a visualization of the plurality of rankings;

selecting a carbon sequestration and storage site from among the plurality of potential carbon sequestration and storage sites based on the visualization; and sequestering and storing carbon at the carbon sequestration and storage site based on the selection.

10. The system of claim 9, wherein the forming the decision matrix comprises normalizing a matrix formed from the random criteria values.

11. The system of claim 9, wherein the visualization comprises:

a plurality of image portions corresponding to at least some of the potential carbon sequestration and storage sites, wherein an image portion for a respective potential carbon sequestration and storage site comprises color codings representing the sets of scores.

12. The system of claim 9, wherein the visualization comprises:

a plurality of curves corresponding to at least some of the potential carbon sequestration and storage sites, wherein a curve for a respective potential carbon sequestration and storage site indicates a distribution of scores of the respective potential carbon sequestration and storage site in the plurality of sets of scores.

13. The system of claim 9, wherein the actions further comprise displaying an ordering of at least some of the potential carbon sequestration and storage sites according to a specified percentile of their respective distribution of scores in the plurality of sets of scores.

14. The system of claim 9, wherein the visualization comprises:

a plurality of curves corresponding to at least some of the potential carbon sequestration and storage sites on a graph comprising an x-axis and a y-axis, wherein the x-axis represents a probability of ranking within an N highest ranked potential carbon sequestration and storage sites according to the plurality of rankings, and wherein the y-axis represents N.

15. The system of claim 9, wherein the actions further comprise:

choosing a subset of the plurality of potential carbon sequestration and storage sites based on the visualization;

repeating the selecting, forming, weighing, and ranking a plurality of times for the subset, wherein a second plurality of rankings are obtained; and displaying a second visualization of the second plurality of rankings, wherein the carbon sequestration and storage site is further selected from among the subset of potential carbon sequestration and storage sites based on the second visualization.

16. The system of claim 9, wherein the forming the decision matrix from the random criteria values comprises applying at least one rule to at least one of the random criteria values to obtain a factor value for at least one criteria.

\* \* \* \* \*